(12) United States Patent
Butterworth

(10) Patent No.: US 9,361,693 B2
(45) Date of Patent: Jun. 7, 2016

(54) ADJUSTING PARAMETERS OF MARINE ELECTRONICS DATA

(71) Applicant: Navico Holding AS, Egersund (NO)

(72) Inventor: Paul Butterworth, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 202 days.

(21) Appl. No.: 13/844,251

(22) Filed: Mar. 15, 2013

(65) Prior Publication Data

US 2014/0009481 A1    Jan. 9, 2014

Related U.S. Application Data

(60) Provisional application No. 61/708,552, filed on Oct. 1, 2012, provisional application No. 61/668,962, filed on Jul. 6, 2012.

(51) Int. Cl.

| | |
|---|---|
| *G06F 9/44* | (2006.01) |
| *G06F 3/0484* | (2013.01) |
| *G06F 3/0485* | (2013.01) |
| *G01S 15/89* | (2006.01) |
| *G01S 7/62* | (2006.01) |
| *G01S 13/93* | (2006.01) |
| *G06T 7/00* | (2006.01) |
| *G01S 15/93* | (2006.01) |
| *G01S 7/10* | (2006.01) |
| *G01S 7/58* | (2006.01) |

(52) U.S. Cl.
CPC . *G06T 7/004* (2013.01); *G01S 7/10* (2013.01); *G01S 7/58* (2013.01); *G01S 7/6218* (2013.01); *G01S 7/6263* (2013.01); *G01S 13/9307* (2013.01); *G01S 15/93* (2013.01); *G06F 3/0484* (2013.01)

(58) Field of Classification Search
CPC .............. G06F 9/4443; G06F 3/04842; G06F 3/04847; G06F 3/04855; G01S 15/89
USPC ...................... 345/173, 581; 367/88; 715/833
See application file for complete search history.

(56) References Cited

U.S. PATENT DOCUMENTS

| | | |
|---|---|---|
| 4,829,493 A | 5/1989 | Bailey |
| 4,879,697 A | 11/1989 | Lowrance et al. |
| 5,025,423 A | 6/1991 | Earp |
| 5,191,341 A | 3/1993 | Gouard et al. |
| 5,537,380 A | 7/1996 | Sprankle et al. |
| 5,825,352 A | 10/1998 | Bisset et al. |
| 6,054,984 A | 4/2000 | Alexander |
| 6,225,984 B1 | 5/2001 | Crawford |

(Continued)

OTHER PUBLICATIONS

PCT International Search Report and Written Opinion; PCT/IB2013/060285; Feb. 18, 2014.

(Continued)

*Primary Examiner* — Matthew Salvucci
(74) *Attorney, Agent, or Firm* — Nelson Mullins Riley & Scarborough LLP

(57) ABSTRACT

A non-transitory computer-readable medium having stored thereon computer-executable instructions which, when executed by a computer, cause the computer to: display marine electronics data on a screen of a multi function display unit; receive a request to adjust the parameter of the marine electronics data; and display an object configured to adjust the parameter. The object includes a default value of the parameter.

18 Claims, 7 Drawing Sheets

(56) References Cited

U.S. PATENT DOCUMENTS

| | | |
|---|---|---|
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,761,692 B2 | 7/2004 | Angelsen et al. |
| 6,816,782 B1 | 11/2004 | Walters et al. |
| 7,002,579 B2 | 2/2006 | Olson |
| 7,236,426 B2 | 6/2007 | Turner et al. |
| 7,430,461 B1 | 9/2008 | Michaels |
| 7,469,381 B2 | 12/2008 | Ording |
| 7,475,057 B1 | 1/2009 | Obradovich |
| 7,479,949 B2 | 1/2009 | Jobs et al. |
| 7,652,952 B2 | 1/2010 | Betts et al. |
| 7,683,771 B1 | 3/2010 | Loeb |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,812,826 B2 | 10/2010 | Ording et al. |
| 7,812,827 B2 | 10/2010 | Hotelling et al. |
| 7,812,828 B2 | 10/2010 | Westerman et al. |
| 7,844,915 B2 | 11/2010 | Platzer et al. |
| 7,864,163 B2 | 1/2011 | Ording et al. |
| 7,870,496 B1 | 1/2011 | Sherwani |
| 7,890,867 B1 | 2/2011 | Margulis |
| 8,019,532 B2 | 9/2011 | Sheha et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,514,658 B2 | 8/2013 | Maguire |
| 8,605,550 B2 | 12/2013 | Maguire |
| 2002/0035574 A1 | 3/2002 | Dumas |
| 2002/0093541 A1 | 7/2002 | Schileru-Key |
| 2003/0218637 A1 | 11/2003 | Sloo et al. |
| 2004/0193364 A1 | 9/2004 | Chojnacki |
| 2004/0240590 A1 | 12/2004 | Cameron et al. |
| 2005/0102101 A1 | 5/2005 | Beesley et al. |
| 2006/0013066 A1 | 1/2006 | Nishimori et al. |
| 2006/0119585 A1 | 6/2006 | Skinner |
| 2006/0136478 A1 | 6/2006 | Berkner |
| 2006/0224940 A1 | 10/2006 | Lee |
| 2006/0238406 A1 | 10/2006 | Nohara et al. |
| 2007/0226656 A1 | 9/2007 | Zwart |
| 2008/0104051 A1 | 5/2008 | Gosper |
| 2008/0126935 A1 | 5/2008 | Blomgren |
| 2008/0183905 A1 | 7/2008 | Kitada |
| 2008/0204424 A1 | 8/2008 | Jin et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0080082 A1 | 4/2010 | Betts et al. |
| 2010/0127847 A1 | 5/2010 | Evans et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0054785 A1* | 3/2011 | Wood ............... G01C 21/00 701/533 |
| 2011/0153186 A1 | 6/2011 | Jakobson |
| 2011/0154183 A1 | 6/2011 | Burns et al. |
| 2011/0258580 A1* | 10/2011 | Syrjarinne et al. ............ 715/810 |
| 2011/0267265 A1 | 11/2011 | Stinson |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0117507 A1 | 5/2012 | Tseng et al. |
| 2012/0185801 A1 | 7/2012 | Madonna et al. |
| 2012/0207309 A1* | 8/2012 | Eppolito ..................... 381/17 |
| 2013/0007665 A1 | 1/2013 | Chaudhri et al. |
| 2013/0019175 A1 | 1/2013 | Kotler et al. |
| 2013/0271301 A1 | 10/2013 | Kabel et al. |
| 2014/0013259 A1 | 1/2014 | Thomas et al. |
| 2014/0013260 A1 | 1/2014 | Thomas et al. |
| 2014/0013276 A1 | 1/2014 | Butterworth |
| 2014/0013284 A1 | 1/2014 | Thomas et al. |
| 2014/0096060 A1 | 4/2014 | Thomas et al. |
| 2014/0250401 A1 | 9/2014 | Matsumoto et al. |

OTHER PUBLICATIONS

PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
NVIDIA Control Panel Setting for Gaming (screenshots); https://www.youtube.com/watch?v=Hkgwmh3oYVo; Jul. 3, 2012 (accessed Jan. 25, 2015).
Microsoft Outlook 2010 (screenshots); 2010 (provided by USPTO Examiner Jan. 30, 2015).

* cited by examiner

ADJUSTING PARAMETERS OF MARINE ELECTRONICS DATA

CROSS-REFERENCE TO RELATED APPLICATIONS

This application claims the benefit of U.S. Provisional Patent Application Ser. No. 61/708,552, filed Oct. 1, 2012, titled RECOMMENDED/DEFAULT SLIDER SETTING, and the disclosure of which is incorporated herein by reference.

This application is related to and claims the benefit of U.S. Provisional Patent Application Ser. No. 61/668,962; filed Jul. 6, 2012; titled HIDDEN SYSTEM MENU; and the disclosure of which is incorporated herein by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Accurate data, including, for example, navigation, mapping, and the location of stationary and moving objects, can be very useful for marine activities. The operator of a marine vessel monitors marine traffic. A device that is easy to operate and that provides data in an easy to follow format can provide advantages to the vessel operator. Such advantages may include requiring less time to request and review information, which in turn provides the vessel operator with more time to monitor the marine traffic.

SUMMARY

Described herein are various implementations directed to a non-transitory computer-readable medium having stored thereon computer-executable instructions which, when executed by a computer, cause the computer to: display marine electronics data on a screen of a multi function display unit; receive a request to adjust the parameter of the marine electronics data; and display an object configured to adjust the parameter. The object includes a default value of the parameter.

Described herein are various implementations directed to an apparatus for displaying marine electronic data. The apparatus includes a screen; one or more processors; and memory having a plurality of executable instructions which, when executed by the one or more processors, cause the one or more processors to: display the marine electronics data on a screen; receive a request to adjust the parameter of the marine electronics data; and display an object configured to adjust the parameter. The object includes a default value of the parameter.

Described herein are various implementations directed to method for adjusting one or more parameters of marine electronics data displayed on a multi-function display ("MFD"). The method includes displaying the marine electronics data on a screen of the MFD; receiving a request to adjust a parameter of the marine electronics data; and displaying an object configured to adjust the parameter. The object includes a default value of the parameter.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
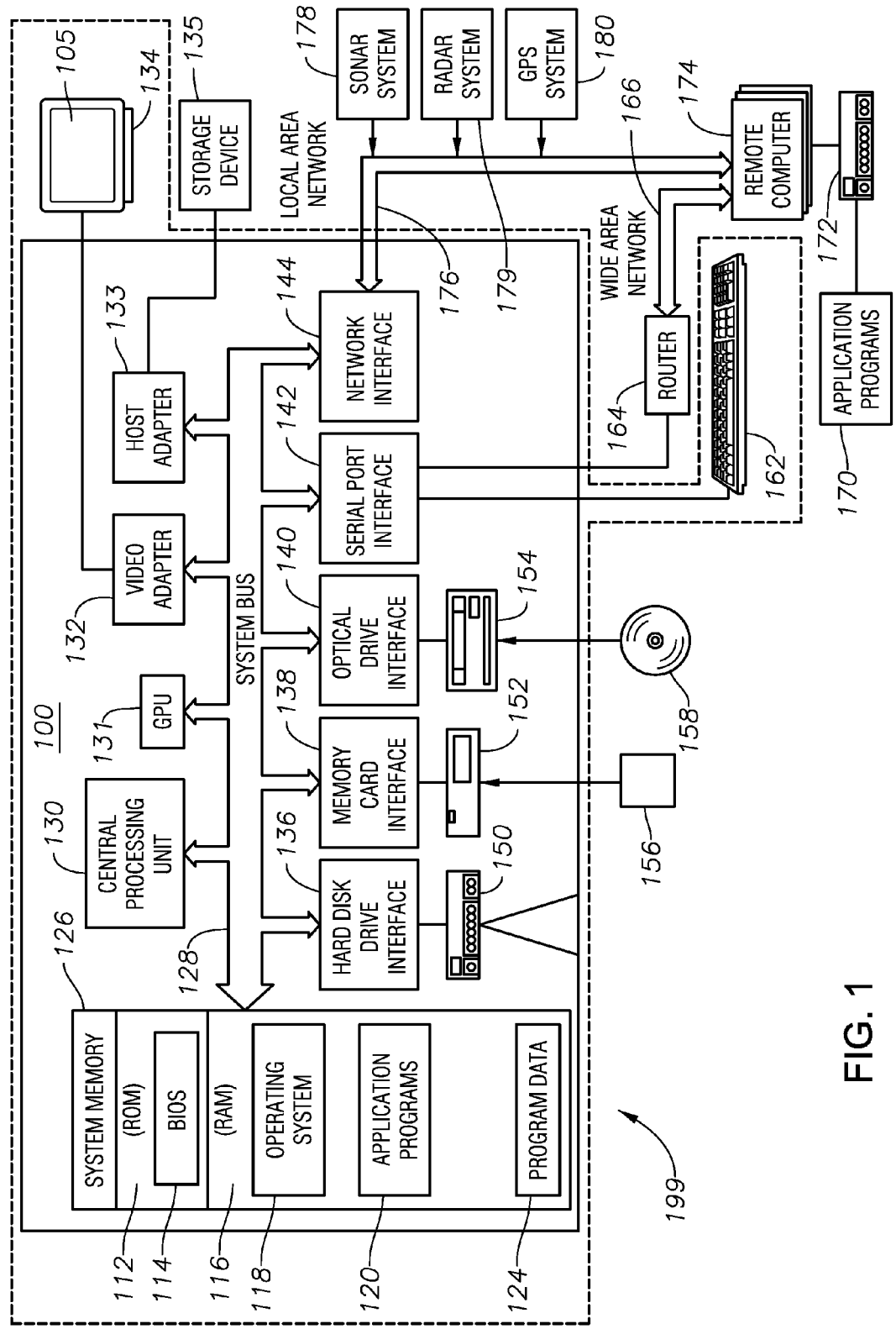
FIG. 1 is a block diagram of a multi-function display in accordance with implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another.

For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that "user request" or "user can request" shall also include, but are not limited to, touching the screen, double tapping the screen (tapping the screen twice in rapid succession), pressing a particular physical or virtual button, making a selection from a menu, placement of a cursor at a particular location, stylus pointing, mouse selection, an audible command, as well as the explicit description of the "user request" for the particular operation or how the "user can request", explicitly, the particular operations.

Multi-function Display

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 1 illustrates a schematic diagram of a multi-function display 199 having a computing system 100 in which the various technologies described herein may be incorporated and practiced. The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 can include a microprocessor, a microcontroller, a processor, a programmable integrated circuit, or a combination thereof. The CPU 130 can comprise an off-the-shelf processor such as a Reduced Instruction Set Computer (RISC™), or a Microprocessor without Interlocked Pipeline Stages (MIPS™) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a screen 105. The screen 105 can be sensitive to heat or touching (now collectively referred to as a "touch screen").

In certain implementations, the GPU 131 can generate objects such as the objects illustrated in FIGS. 2, 3 and 5-7.

The system bus 128 may be any of several types of bus structures, including a memory bus or memory controller, a peripheral bus, and a local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide non-volatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The remote computers 174 can also include hard disks 172 that store application programs 170.

In certain implementations, various techniques, including the flow diagram, described herein can be implemented by a plurality of executable instructions stored in RAM. Alternatively, the plurality of executable instruction can be stored in the hard disk 150, or removable computer-readable media such as memory card 156 or optical media 158 until needed for execution.

A number of program modules may be stored on the hard disk 150, memory card 156, optical disk 158, ROM 112 or RAM 116, including an operating system 118, one or more application programs 120, and program data 124. In certain implementations, the hard disk 150 may store a database system. The database system could include, for example, recorded points. The application programs 120 may include various mobile applications ("apps") and other applications configured to perform various methods and techniques described herein. The operating system 118 may be any suitable operating system that may control the operation of a networked personal or server computer.

A user may enter commands and information into the computing system 100 through input devices such as buttons 162. Other input devices may include a microphone (not shown). These and other input devices may be connected to the CPU 130 through a serial port interface 142 coupled to system bus 128, but may be connected by other interfaces, such as a parallel port, game port or a universal serial bus (USB).

Certain implementations may be configured to be connected to a sonar system 178, radar interface 179, and GPS system 180. The sonar system 178, radar interface 179, and GPS system 180 may be connected via the network interface 144. The computing system 100, the monitor 134, the screen 105, and the buttons 162 may be integrated into a console, forming the multi-function display 199.

Figure 2:
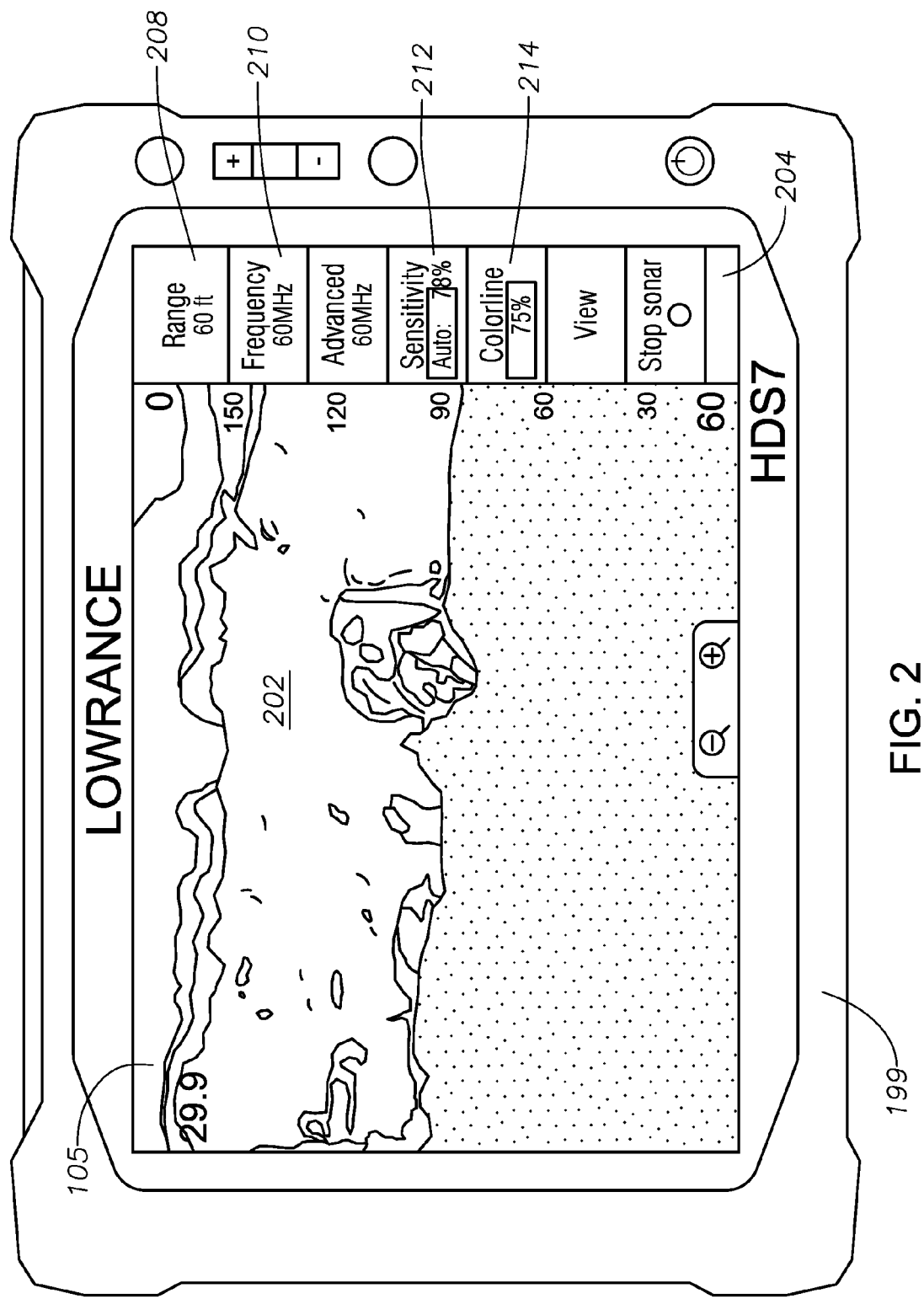
FIG. 2 illustrates a schematic diagram of touch screen of the multi-function display in accordance with implementations of various techniques described herein.

FIG. 2 illustrates a schematic diagram of touch screen 105 of the MFD 199 in accordance with implementations of various techniques described herein. In one implementation, the touch screen 105 may display marine electronics data, e.g., sonar data 202, as shown in FIG. 2. In addition, the touch screen 105 may also display a side menu 204, which may include one or more side options to enhance, alter, and/or edit the displayed sonar data 202. The side menu 204 may be displayed at or proximate to an edge of the touch screen 105. The user may select any of the side options via touching of the touch screen 105. In one implementation, the side options may include options to control certain parameters, e.g., range 208, frequency 210, sensitivity 212, colorline 214, or other settings of marine electronics data being displayed on the touch screen. A user can select a particular parameter to control by selecting the parameter option from the side menu 204. In certain implementations, the user can select the particular parameter by touching the particular parameter option. For example, the user can control the sensitivity parameter by touching the option for the sensitivity parameter 212.

Figure 3:
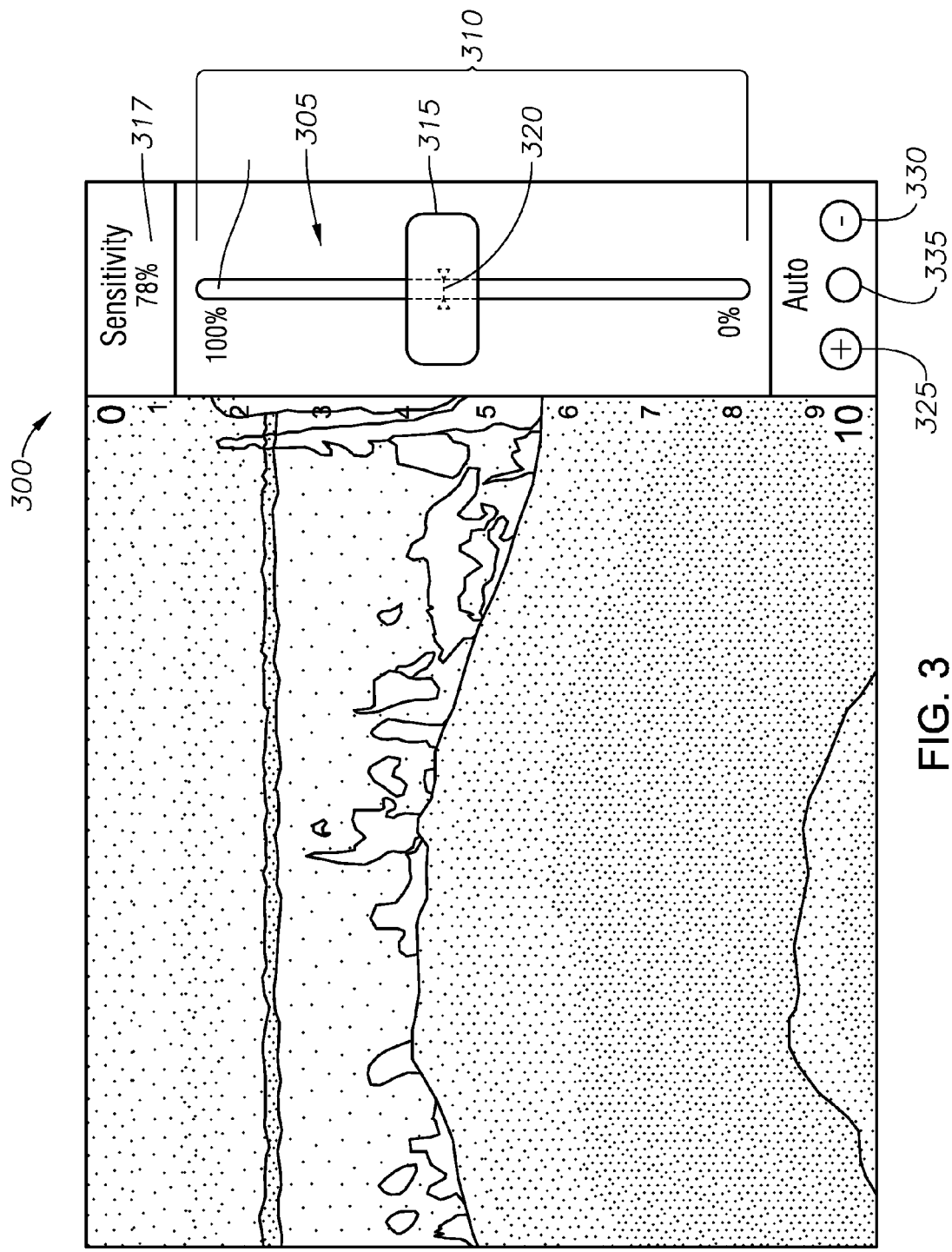
FIG. 3 is a schematic of a sliding bar mechanism in accordance with implementations described herein.

In one implementation, the multi-function display 199 may be configured to display an object for controlling the selected parameter, e.g., sensitivity. One example for such an object is shown in FIG. 3. In this implementation, the object 300 includes a sliding bar mechanism 305. The sliding bar mechanism 305 may include a range 310, a sliding bar 315, a numeric readout 317, and a default position 320. The position of the sliding bar 315 relative to the range 310 controls the value of the parameter. The numeric readout 317 indicates the numeric setting of the parameter. The default position 320 indicates a default value for the parameter and is indicated in the range 310. In certain implementations, the default value is located in the center of the range 310. In certain implementations, the user can adjust the sliding bar 315 by touching a point on the range above or below the sliding bar 315, or directly touching adjust the sliding bar 315 and dragging the sliding bar 315. Additionally, in certain implementations, the sliding bar mechanism 305 can also include increase 325, and decrease 330 buttons. Any other types of buttons, e.g., an auto button 335 or the like, can also be present. Selection of the auto buttons 335 results in immediate setting of the sliding bar 315 and the parameter controlled by the sliding bar 315 to the default value/position 320. In the example of FIG. 3, the default value for the sensitivity parameter is 78%. It is noted that the range 310 is not necessarily drawn to scale and inferences should not be implied on that basis.

The object 300 can control a variety of parameters. For example, the MFD 199 may display a sensitivity level (shown) or a color line related to the sonar data 202. In another implementation in lieu of sonar data, the marine electronics data may display other data, such as radar data, e.g., data relating to gain, sea clutter, rain clutter, transparency, and threshold. In another implementation, the computing device may display data relating to audio data, such as bass or treble.

The parameters that can be controlled can include parameters relating to autopilot data, such as "Response—Low," "Response—High," "Response—Wind," "Tracking response," "Manual speed," "Course response," "Rudder," "Counter rudder," "Track response," Rate of turn, Spiral radius change per turn, Spiral initial radius, Main Course, Zigzag Leg Distance, Zigzag Course Change, Square Leg Distance, Lazy S Radius, Lazy S Course Change, "Depth gain," Depth CCA, Reference depth, Track offset, Rudder power, Rudder angle, Thruster power, "Motor output," "Manual deadband," "Tack time," "Tack angle," "Boat Length," "Cruising speed," "Transition speed," "Thruster inhibit speed," "Low speed limit," "Track approach angle," "Autotrim," "Off heading limit," "Tow angle," "Thruster sensitivity," "XTD limit," "Course change limit," "Manual trim adaption time constant," and "g-force."

Parameters relating to audio data that can be adjusted include "volume", "SonicHub speaker volume," "Limit", "sonic hub sound level limit," "Balance", "sonic hub balance left to right control," "Fade", "sonichub speaker control front to rear," "Sub limit", "subwoofer limit", "Bass", "Low end frequencies", "Treble", and "higher end frequencies." In addition, the user may use the recommended/default slider to access parameters relating to video data, such as Brightness, Saturation, Contrast, Hue, and Cycle Period.

Parameters relating to chart data that can be adjusted include "Photo transparency", Radar Overlay Range, Radar Overlay Gain, Radar Overlay Sea Clutter, Radar Overlay Rain Clutter, Radar Overlay Transparency, Radar Overlay Chart Threshold, "Wind barbs spacing", "Transparency", "the transparency of the weather overlay", Weather animation time step, Structure Overlay Transparency, Structure Overlay Tvg, "Warm SST", "Sirius Weather menu selection SST means Sea Surface Temperature", "Cool SST", "Sirius Weather menu selection SST means Sea Surface Temperature", "Max wave height", "Sirius Weather menu selection", "Min wave height", "Sirius Weather menu selection", Navionics Photo Opacity, and Structure Overlay Contrast.

Parameters relating to radar data that can be adjusted include Bearing alignment, Range offset, Antenna height, Park angle, Fine tune, Coarse tune, Sidelobe suppression, Gain, Sea clutter, Rain clutter, Guard zone sensitivity, Guard zone depth, Guard zone range, Guard zone bearing, Guard zone width, and Threshold.

Parameters relating to sonar data that can be adjusted include "Sensitivity", "Colorline", "Color", "Contrast", "Overlay", "TVG", "Clarity", "Ping speed", "Scroll speed", "Water speed averaging," temperature averaging, and water speed calibration.

Additionally, parameters relating to navigation data that can be adjusted include "Arrival Radius", "XTE Limit", "Latitudinal Offset", and "Longitudinal Offset." Parameters relating to tracks data that can be adjusted include shallow depth and deep depth. Parameters relating to fuel data that can be adjusted include search radius. Parameters relating to system data that can be adjusted include Backlight brightness, Heading Damping, Apparent Wind Damping, Calculated Wind Damping, Boat Speed Damping, Depth Damping, and Local time offset.

Figure 4:
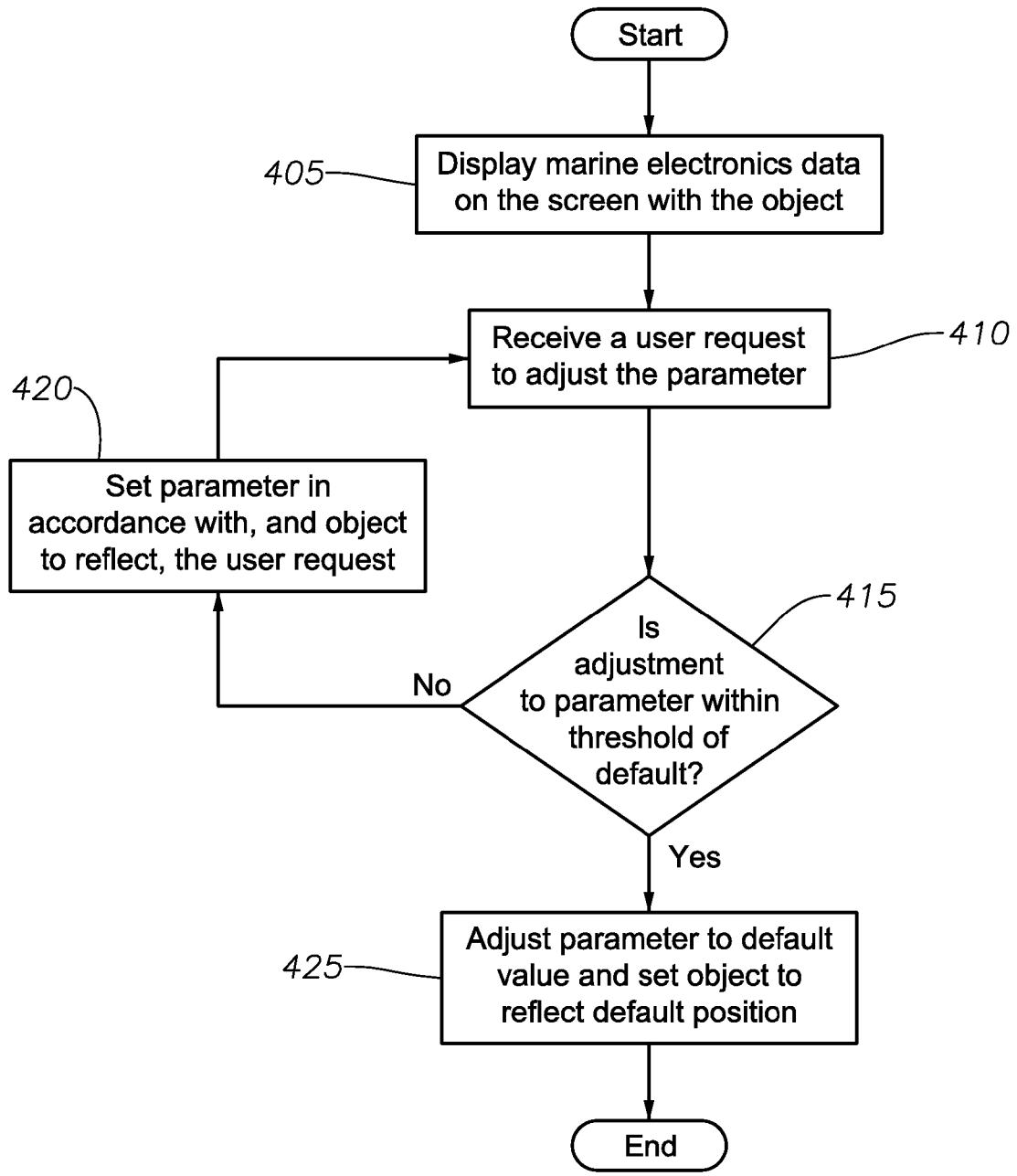
FIG. 4 is a flow diagram describing an operation of the multi-function display in accordance with implementations described herein.

FIG. 4 is a flow diagram describing the operation of the object 200 in accordance with various implementations described herein. FIG. 4 will be described in connection with FIGS. 3, 5, and 6. It should be understood that while the operational flow diagram 400 indicates a particular order of execution of the operations, in other implementations, the operations might be executed in a different order. Further, in some implementations, additional operations or steps may be added to the method. Likewise, some operations or steps may be omitted.

At block 405, the multi-function display 199 displays the marine electronics data on the screen 105 along with the object 300. The marine electronic data is associated with a parameter that can be adjusted.

At block 410, the multi-function display 199 receives a user request to adjust the parameter. In certain implementations, the user request can include graphically (e.g., touching or pointing and click with a mouse) selecting a portion of the object.

Turning to FIG. 3, in certain implementations, selection of a portion of the object can include selection of the increase 325 or decrease buttons 330, selection of a value along the range 310, touching a position along the range 310, or moving the sliding bar 315.

In one implementation, at block 415, a determination is made as to whether the user request is within a predetermined threshold of the default value 320. If the user request is within the predetermined threshold of the default value, the multi-function display automatically adjusts the parameter to the default value, and the object to reflect the default position 320, at block 425. In certain implementations, this feature may be visually represented as "snapping" the sliding bar 315 to the default position 320. If the adjustment to the parameter is not within the threshold of the default position, at block 420, the multi-function display 199 accordingly adjusts the parameter in accordance with, and sets the object to reflect the user request.

Figure 5:
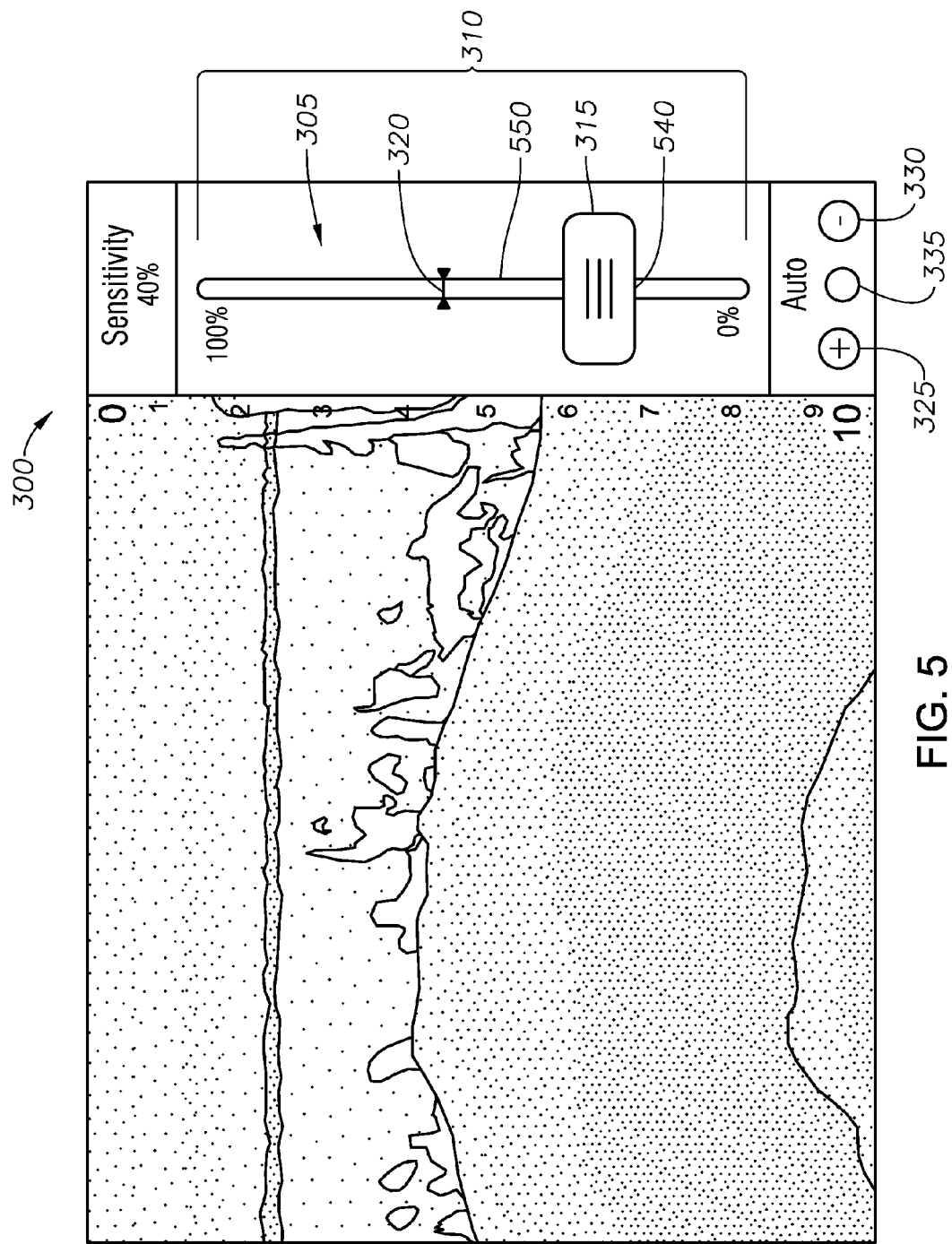
FIG. 5 is a schematic illustrating adjustments to the sliding bar mechanism in accordance with implementations described herein.

FIG. 5 is a schematic diagram describing adjustment of the parameter on the object 300. As noted above, the user request to adjust the parameter can comprise graphically (touching or pointing and click with a mouse) selecting a portion of the object 300. In certain embodiments, selection of a portion of the object can include selection of the increase 325 or decrease buttons 330, selection of a value along the range 310, or moving the sliding bar 315. In the example of FIG. 4, the user has requested 40% for the sensitivity parameter, while the default value can be 78% and the predetermined threshold from the default value can be 8%, or 70% sensitivity. Since the user has not selected a value that is within the predetermined threshold from the default value, the multi-function display 199 sets the sensitivity parameter at 40% as described in block 420.

Figure 6:
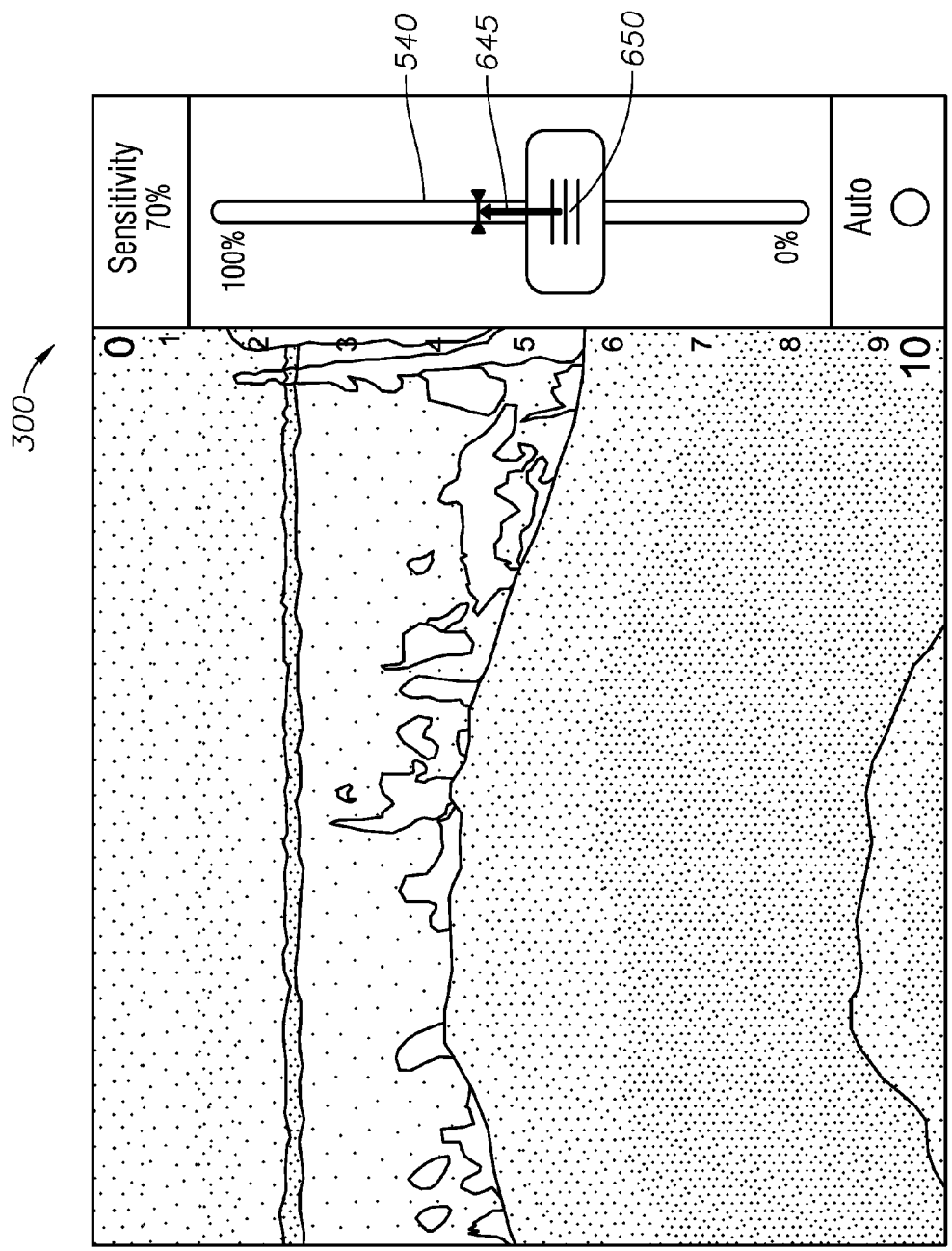
FIG. 6 is a schematic of the sliding bar mechanism moving from a predetermined threshold of a default to the default in accordance with implementations described herein.

Turning to FIG. 6, if the user requests a 70% sensitivity, the parameter is within a predetermined threshold 540 (8%) of the default value, 78%. The multi-function display 199 adjusts the parameter to the default value 78%, and places the sliding bar 315 at the default position 320 at block 425. In certain implementations, the multi-function display 199 can "snap" 645 the sliding bar 315 to the default position 320 from the predetermined threshold of the default position 540. In one implementation, the predetermined threshold 540 above the default position 420 and the predetermined threshold 650 below the default position can be different. In another implementation, the parameter is maintained at the default position for a predetermined period of time. After the predetermined period of time expires, the parameter may be further adjusted, i.e., by moving the sliding bar 315.

Figure 7:
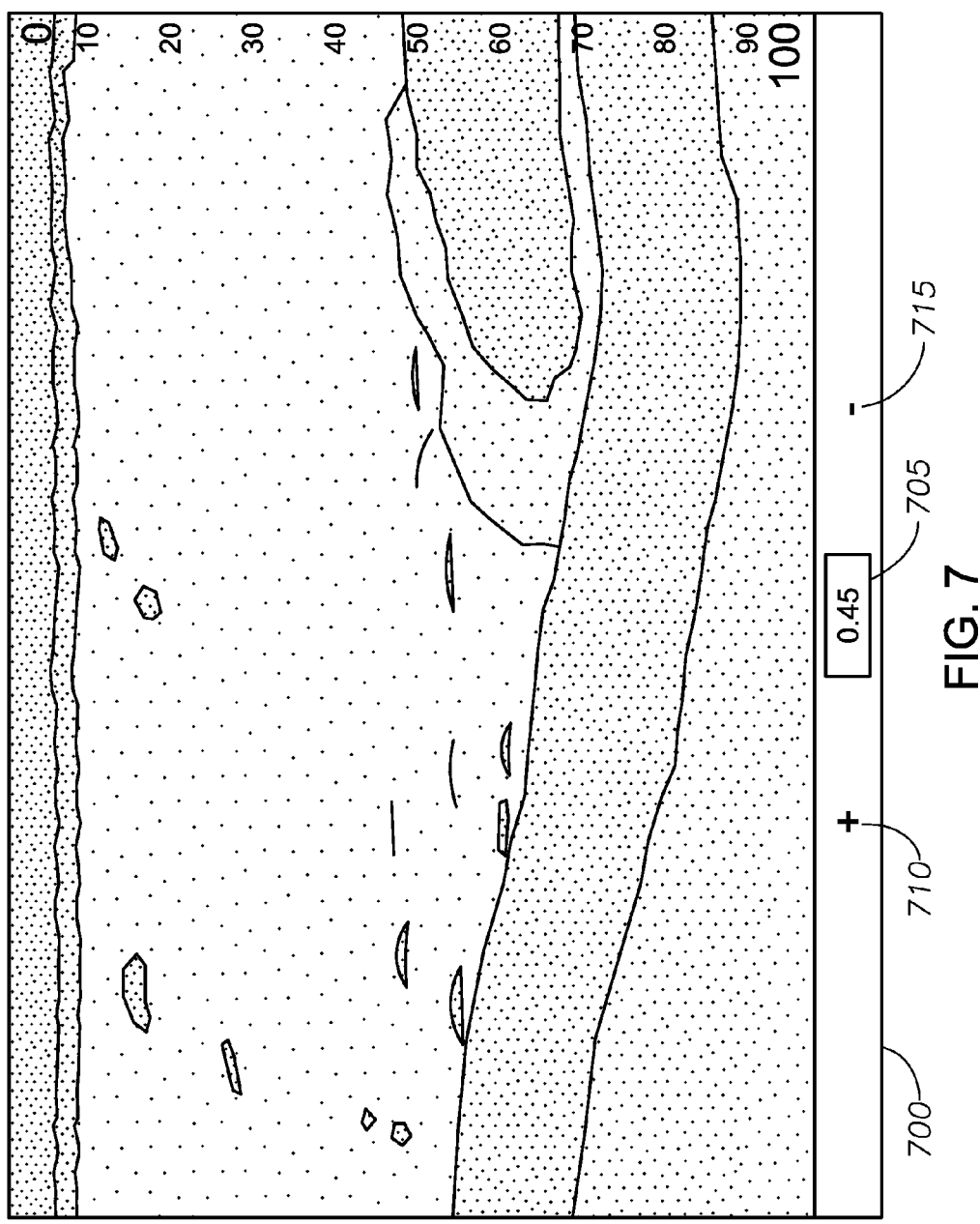
FIG. 7 is a schematic of an object comprising a number box in accordance with implementations described herein.

Although the object 300 has been described as having a sliding bar mechanism 305, in some implementations, the multi-function display 199 can include other objects 300 for adjusting the parameter, such as a number box. FIG. 7 is a schematic of an object 300 having a number box 700. The number box 700 includes box 705 for typing in a parameter value, an increment button 710, and a decrement button 715. The user can set the parameter value by either typing the parameter value in the box 705 or increasing/decreasing the parameter value using the increment 710 and decrement buttons 715. If the parameter value comes within a predetermined threshold of a default value, the number box 700 automatically changes the number in the box 705 to the default value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon computer-executable instructions which, when executed by a computer, cause the computer to:
   display marine electronics data along with one or more selectable parameters on a screen of a marine electronics device;
   receive a request to adjust a selected parameter from the one or more selectable parameters via the screen of the marine electronics device;
   display an object on the screen of the marine electronics device, in place of the one or more selectable parameters while continuing to display the marine electronics data, wherein the object is configured to adjust the selected parameter; and
   remove remaining unselected parameters of the one or more selectable parameters from being displayed on the screen of the marine electronics device,
   wherein the object comprises a range of possible parameter values and a sliding bar disposed at a default position on the range of possible parameter values, wherein the default position corresponds to a default value.

2. The non-transitory computer-readable medium of claim 1, wherein the computer-executable instructions also cause the computer to:
   receive a request to adjust the selected parameter to a particular value, wherein the request is received at the object; and
   adjust the selected parameter to the particular value.

3. The non-transitory computer-readable medium of claim 1, wherein the computer-executable instructions also cause the computer to:
   receive a request to adjust the selected parameter to a particular value that is within a predetermined threshold of the default value; and
   automatically adjust the selected parameter to the default value.

4. The non-transitory computer-readable medium of claim 1, wherein the computer-executable instructions also cause the computer to:
   display a side menu comprising the one or more selectable parameters while displaying the marine electronics data.

5. The non-transitory computer-readable medium of claim 1, wherein the computer-executable instructions further cause the computer to:
   receive a request to move the sliding bar to a particular parameter value along the range, wherein the particular parameter value is within a predetermined threshold from the default position; and
   automatically adjusting the sliding bar to the default position.

6. The non-transitory computer-readable medium of claim 1, wherein the object comprises a box for typing a parameter value, and wherein if the entered parameter value is within the predetermined threshold from the default value, the computer-executable instructions cause the computer to set the selected parameter to the default value.

7. The non-transitory computer-readable medium of claim 1, wherein the marine electronics data comprise sonar data, and wherein the instructions that cause the computer to display the object in place of the selectable parameters comprise instructions that cause the computer to display the sonar data along with the object.

8. A marine electronics device, comprising:
   a screen;
   one or more processors; and
   memory having a plurality of executable instructions which, when executed by the one or more processors, cause the one or more processors to:
      display marine electronics data along with one or more selectable parameters on the screen;
      receive a request to adjust a selected parameter from the one or more selectable parameters via the screen;
      display an object on the screen, in place of the one or more selectable parameters while continuing to display the marine electronics data, wherein the object is configured to adjust the selected parameter; and
      remove remaining unselected parameters of the one or more selectable parameters from being displayed on the screen,
      wherein the object comprises a range of possible parameter values and a sliding bar disposed at a default position on the range of possible parameter values, wherein the default position corresponds to a default value.

9. The apparatus of claim 8, wherein the plurality of executable instructions also cause the one or more processors to:
   receive a request to adjust the selected parameter to a particular value, wherein the request is received at the object; and
   adjust the selected parameter to the particular value.

10. The apparatus of claim 8, wherein the plurality of executable instructions also cause the one or more processors to:
  receive a request to adjust the selected parameter to a particular value that is within a predetermined threshold of the default value; and
  automatically adjust the selected parameter to the default value.

11. The apparatus of claim 8, wherein the plurality of executable instructions also cause the one or more processors to:
  display a side menu comprising the one or more selectable parameters while displaying the marine electronics data.

12. The apparatus of claim 8, wherein the plurality of executable instructions also cause the one or more processors to:
  receive a request to adjust the selected parameter to a particular value that is within a predetermined threshold of the default value; and
  automatically adjust the sliding bar to the default position.

13. The apparatus of claim 8, wherein the object comprises a box for typing a parameter value, and wherein if the entered parameter value is within the predetermined threshold from the default value, the plurality of executable instructions cause the one or more processors to set the selected parameter to the default value.

14. A method for adjusting one or more parameters of marine electronics data displayed on a marine electronics device, comprising:
  displaying marine electronics data along with one or more selectable parameters on a screen of a marine electronics device;
  receiving a request to adjust a selected parameter from the one or more selectable parameters via the screen of the marine electronics device;
  displaying an object on the screen of the marine electronics device, in place of the one or more selectable parameters while continuing to display the marine electronics data, wherein the object is configured to adjust the selected parameter; and
  removing remaining unselected parameters of the one or more selectable parameters from being displayed on the screen of the marine electronics device,
  wherein the object comprises a range of possible parameter values and a sliding bar disposed at a default position on the range of possible parameter values, wherein the default position corresponds to a default value.

15. The method of claim 14, further comprising:
  receiving a request to adjust the selected parameter to a particular value, wherein the request is received at the object; and
  adjusting the selected parameter to the particular value.

16. The method of claim 14, further comprising:
  receiving a request to adjust the selected parameter to a particular value that is within a predetermined threshold of the default value; and
  automatically adjusting the selected parameter to the default value.

17. The method of claim 14, further comprising:
  displaying a side menu comprising the one or more selectable parameters while displaying the marine electronics data.

18. The method of claim 14, further comprising:
  receiving a request to move the sliding bar to a particular parameter value along the range, wherein the particular parameter value is within a predetermined threshold from the default position; and
  automatically adjusting the bar to the default position.

* * * * *